United States Patent
Zhang et al.

(10) Patent No.: US 11,113,514 B2
(45) Date of Patent: Sep. 7, 2021

(54) IDENTITY VERIFICATION METHODS, SYSTEMS, APPARATUSES, AND DEVICES

(71) Applicant: Advanced New Technologies Co., Ltd., George Town (KY)

(72) Inventors: Hong Zhang, Hangzhou (CN); Yanchu Guan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,573

(22) Filed: May 29, 2020

(65) Prior Publication Data

US 2020/0293762 A1 Sep. 17, 2020

Related U.S. Application Data

(63) Continuation of application No. PCT/CN2019/071688, filed on Jan. 15, 2019.

(30) Foreign Application Priority Data

Jan. 30, 2018 (CN) .......................... 201810089504.3

(51) Int. Cl.
*G06K 9/00* (2006.01)
*H04W 4/80* (2018.01)

(52) U.S. Cl.
CPC ..... *G06K 9/00295* (2013.01); *G06K 9/00248* (2013.01); *G06K 9/00778* (2013.01); *H04W 4/80* (2018.02)

(58) Field of Classification Search
CPC ........... G06K 9/00295; G06K 9/00248; G06K 9/00778; G06K 9/00288; G06K 9/00228;
(Continued)

(56) References Cited

U.S. PATENT DOCUMENTS 6,813,312 B2 * 11/2004 Tullberg .......... G08B 13/19697
375/240.01
7,362,210 B2 * 4/2008 Bazakos .............. G07B 15/063
340/5.53
(Continued)

FOREIGN PATENT DOCUMENTS

CN  104639907  5/2015
CN  205068523  3/2016
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Wesley J Tucker
(74) *Attorney, Agent, or Firm* — Fish & Richardson P.C.

(57) ABSTRACT

While a user is located outside a verification area, one or more computing devices are used to obtain, in real time, a first image of the user. The one or more computing devices are used to store the first image among a plurality of images. While the user is located inside the verification area, the one or more computing devices are used to obtain identification information from the user. The one or more computing devices are used to identify, based on the identification information, a second image that is associated with the identification information. The one or more computing devices are used to perform identity verification on the user using the plurality of images, including the first image, and the second image.

16 Claims, 10 Drawing Sheets

(58) Field of Classification Search
CPC .. H04W 4/80; G07C 9/37; G07C 9/26; G07C 9/38; G07C 9/257; G07C 9/27
See application file for complete search history.

(56) References Cited

U.S. PATENT DOCUMENTS

| | | | |
|---|---|---|---|
| 8,984,622 B1 | 3/2015 | Baldwin et al. | |
| 9,872,048 B2* | 1/2018 | Zalewski | G06K 9/62 |
| 10,679,252 B2* | 6/2020 | Jiang | G06K 9/00228 |
| 10,810,779 B2* | 10/2020 | Zatepyakin | G06K 9/00 |
| 2007/0200919 A1 | 8/2007 | D'Amora et al. | |
| 2007/0252001 A1* | 11/2007 | Kail | G07C 9/33 235/380 |
| 2008/0025710 A1* | 1/2008 | Sugimoto | H04N 5/23219 396/48 |
| 2008/0158407 A1* | 7/2008 | Funamoto | H04N 5/23218 348/345 |
| 2011/0001827 A1* | 1/2011 | Ortiz | H04L 63/0492 348/156 |
| 2017/0004369 A1* | 1/2017 | Kim | G06K 9/6255 |
| 2019/0046057 A1* | 2/2019 | Lai | G06K 9/00234 |
| 2019/0057249 A1* | 2/2019 | Hayase | G06K 9/00899 |

FOREIGN PATENT DOCUMENTS

| | | |
|---|---|---|
| CN | 106650560 | 5/2017 |
| CN | 106887058 | 6/2017 |
| CN | 107133608 | 9/2017 |
| CN | 107634835 | 1/2018 |
| CN | 108427911 | 8/2018 |
| EP | 3091507 | 11/2016 |
| TW | M387297 | 8/2010 |
| TW | 201317901 | 5/2013 |
| WO | WO 2017146160 | 8/2017 |

OTHER PUBLICATIONS

Han, "Design and Implementation of Examinee Identity Authentication System Based on Face Recognition Technology", Computer & Digital Engineering, Jan. 2012, vol. 40, No. 1, pp. 148-150 (with English abstract).

Nakamoto, "Bitcoin: A Peer-to-Peer Electronic Cash System," www.bitcoin.org, 2005, 9 pages.

PCT International Search Report and Written Opinion in International Application No. PCT/CN2019/071688, dated Apr. 16, 2019, 10 pages (with partial English translation).

Extended European Search Report in European Application No. 19748319.1, dated Dec. 21, 2020, 8 pages.

PCT International Preliminary Report on Patentability in International Application No. PCT/CN2019/071688, dated Aug. 4, 2020, 9 pages (with English translation).

* cited by examiner

IDENTITY VERIFICATION METHODS, SYSTEMS, APPARATUSES, AND DEVICES

CROSS-REFERENCE TO RELATED APPLICATIONS

This application is a continuation of PCT Application No. PCT/CN2019/071688, filed on Jan. 15, 2019, which claims priority to Chinese Patent Application No. 201810089504.3, filed on Jan. 30, 2018, and each application is hereby incorporated by reference in its entirety.

TECHNICAL FIELD

The present specification relates to the field of information technologies, and in particular, to identity verification methods, systems, apparatuses, and devices.

BACKGROUND

Currently, identity verification technologies based on face recognition are emerging. In practice, an identity verification system for collecting a face image can be disposed in a place such as a supermarket or a subway station, and the identity verification system is configured to perform identity verification on a user who enters a verification area.

Specifically, by using a scenario in which a user takes the subway as an example, the identity verification system can be disposed at a subway station. If the user wants to take the subway, the user needs to enter a verification area. The identity verification system collects a face image of the user and obtains an account identifier displayed by the user, and then determines whether the collected face image matches a pre-stored face image corresponding to the account identifier. If yes, the identity verification system determines that the user passes identity verification, and instructs a subway gate to open to allow the user to take the subway.

Based on the existing technology, a more convenient identity verification method is needed.

SUMMARY

Implementations of the present specification provide identity verification methods, systems, apparatuses, and devices, so as to alleviate a problem that an existing identity verification method is not convenient for users.

To alleviate the previous technical problem, the implementations of the present specification are implemented as described below.

An implementation of the present specification provides an identity verification method, including: obtaining a real-time face image of a user located outside a verification area, and storing the obtained real-time face image; obtaining an identification provided by a user who enters the verification area; obtaining, based on the obtained identification, a pre-stored face image corresponding to the identification; and performing, based on each stored real-time face image and the obtained pre-stored face image, identity verification on the user who enters the verification area.

An implementation of the present specification provides another identity verification method, including: obtaining and storing, by a server by using a collection device, a real-time face image of a user located outside a verification area; receiving, by the server, an identification sent by the collection device, where the identification is provided to the collection device by a user who enters the verification area; obtaining, by the server based on the identification, a pre-stored face image corresponding to the identification; and performing, by the server based on each stored real-time face image and the determined pre-stored face image, identity verification on the user who enters the verification area.

An implementation of the present specification provides another identity verification method, including: collecting, by a collection device, a real-time face image of a user located outside a verification area; sending, by the collection device, the obtained real-time face image to a server for storage; obtaining, by the collection device, an identification provided by a user who enters the verification area; and sending, by the collection device, the obtained identification to the server, so the server obtains, based on the received identification, a pre-stored face image corresponding to the identification, and further performs, based on each stored real-time face image and the obtained pre-stored face image, identity verification on the user who enters the verification area. An implementation of the present specification provides an identity verification system, including a collection device and a server.

The collection device obtains a real-time face image or a real-time image, and sends the obtained real-time face image or real-time image to the server, where the real-time face image is a real-time face image of a user located outside a verification area, and the real-time image is a real-time image outside the verification area; and obtains an identification provided by a user who enters the verification area, and sends the obtained identification to the server; and the server receives and stores the real-time face image sent by the collection device, or receives the real-time image sent by the collection device, and extracts a face image from the real-time image as a real-time face image for storage; and receives the identification sent by the collection device, obtains, based on the identification, a pre-stored face image corresponding to the identification, and performs, based on each stored real-time face image and the obtained pre-stored face image, identity verification on the user who enters the verification area.

An implementation of the present specification provides an identity verification apparatus, including: a first acquisition module, configured to obtain and store, by using a collection device, a real-time face image of a user located outside a verification area; a receiving module, configured to receive an identification sent by the collection device, where the identification is provided to the collection device by a user who enters the verification area; a second acquisition module, configured to obtain, based on the identification, a pre-stored face image corresponding to the identification; and an identity verification module, configured to perform, based on each stored real-time face image and the determined pre-stored face image, identity verification on the user who enters the verification area.

An implementation of the present specification provides a server, including one or more processors and one or more memories, where the memory stores a program, and the program is configured to be used by the one or more processors to perform the following steps: obtaining and storing, by using a collection device, a real-time face image of a user located outside a verification area; receiving, by the server, an identification sent by the collection device, where the identification is provided to the collection device by a user who enters the verification area; obtaining, by the server based on the identification, a pre-stored face image corresponding to the identification; and performing, by the server based on each stored real-time face image and the determined pre-stored face image, identity verification on the user who enters the verification area.

An implementation of the present specification provides another identity verification apparatus, including: a first acquisition module, configured to obtain a real-time face image of a user located outside a verification area; a first sending module, configured to send the obtained real-time face image to a server for storage; a second acquisition module, configured to obtain an identification provided by a user who enters the verification area; and a second sending module, configured to send the obtained identification to the server, so the server obtains, based on the received identification, a pre-stored face image corresponding to the identification, and further performs, based on each stored real-time face image and the obtained pre-stored face image, identity verification on the user who enters the verification area.

An implementation of the present specification provides a collection device, including an image collector, an identification collector, and a communications unit.

The image collector obtains a real-time face image of a user located outside a verification area; the identification collector obtains an identification provided by a user who enters the verification area; and the communications unit sends the obtained real-time face image and the obtained identification to a server, so the server stores the received real-time face image, obtains, based on the received identification, a pre-stored face image corresponding to the identification, and further performs, based on each stored real-time face image and the obtained pre-stored face image, identity verification on the user who enters the verification area.

According to the technical solutions provided in the implementations of the present specification, in the implementations of the present specification, before the user enters the verification area, the identity verification system can obtain and store the real-time face image of the user. After the user enters the verification area, the identity verification system needs to obtain only the identification provided by the user, and can obtain, based on the obtained identification, the pre-stored face image corresponding to the identification; and further verify the identity of the user based on the stored real-time face image and the obtained pre-stored face image. As such, after the user enters the verification area, the identity verification system can quickly complete identity verification on the user by obtaining only the identification provided by the user, and no need to consume time to collect the real-time face image of the user. That is, after the user enters the verification area, identity verification on the user can be completed in a short time.

BRIEF DESCRIPTION OF DRAWINGS

To describe the technical solutions in the implementations of the present specification or in the existing technology more clearly, the following briefly introduces the accompanying drawings for describing the implementations or the existing technology. Clearly, the accompanying drawings in the following description merely show some implementations of the present specification, and a person of ordinary skill in the art can still derive other drawings from these accompanying drawings without creative efforts.

DESCRIPTION OF IMPLEMENTATIONS

In an existing face recognition-based identity verification method, an "identification+real-time face image" method is generally used to verify a user's identity, so as to determine whether the user is the actual owner of the identification that user provides. The identification can uniquely identify a user identity, and the identification can be specifically an account identity, an account number, a mobile phone number, an identity card number, etc. The real-time face image is a face image collected by an identity verification system for a user for who identity verification is to be performed.

It can be understood that, for each to-be-verified user, a prerequisite for performing identity verification on the user is to obtain a combination of "identification+real-time face image" provided by the user. In practice, a specified area for performing identity verification (referred to as a verification area in the present specification) is usually pre-determined, and a user needs to enter the verification area to provide the user's identification to be used and a real-time face image of the user (usually obtained by the identity verification system in real time) to the identity verification system.

Specifically, for each user who enters the verification area, the identity verification system needs to collect a real-time face image of the user, and also needs to obtain an identification displayed by the user. Then, the identity verification system compares the collected real-time face image with a pre-stored face image corresponding to the identification (that is, a face image of the actual owner of the identification). If the two images match each other, it is determined that the user is the actual owner of the identification displayed by the user, and the user can pass identity verification.

Figure 1:
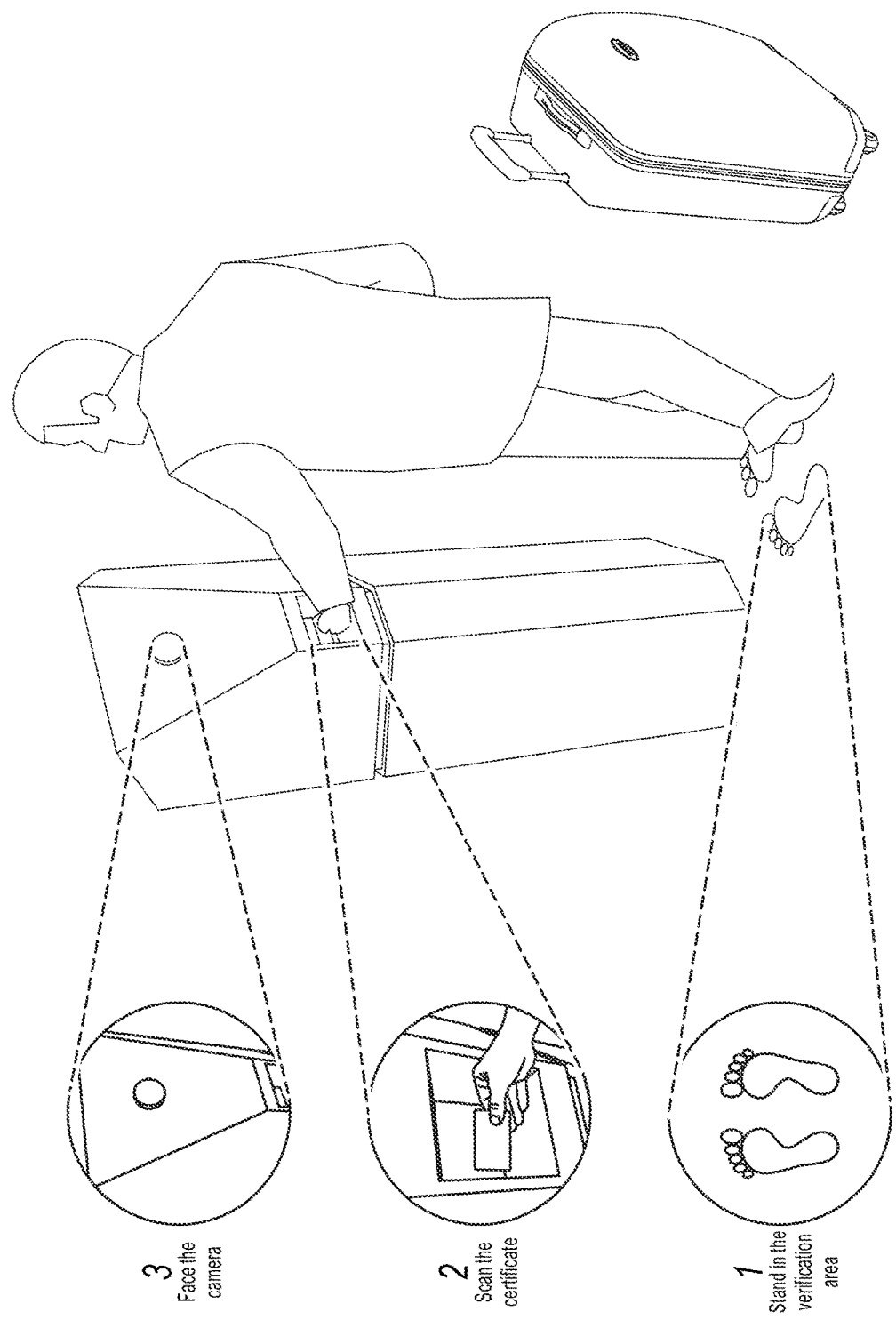
FIG. 1 is a schematic diagram illustrating identity verification performed on a user who enters a station to take a train in the existing technology.

FIG. 1 is a schematic diagram illustrating identity verification performed on a user who enters a station to take a train in the existing technology. As shown in FIG. 1, if a user wants to enter a station to take a train, the user needs to stand in a verification area, display a certificate (which can be specifically a ticket or an identity card) to an identity verification system, and cooperate with the identity verification system to collect a real-time face image of the user.

However, as shown in FIG. 1, it takes some time (usually several seconds) for the identity verification system to collect the real-time face image of the user. If the user does not immediately face a camera after entering the verification area, the face image cannot be collected, and it takes a longer time for the identity verification system to collect the real-time face image of the user. It can be understood that before the identity verification system collects the real-time face image of the user, the user has to wait in the verification area. This is not convenient for the user. In particular, in the scenario that users enter a station to take a train shown in FIG. 1, sometimes many users line up to enter the station. If each user in the queue needs to wait for several seconds after entering the verification area, a forward speed of the queue is clearly lowered.

However, in implementations of the present specification, before a user enters the verification area, the identity verification system can obtain and store a real-time face image of the user. After the user enters the verification area, the identity verification system can perform identity verification on the user only by obtaining an identification provided by the user. According to implementations of the present specification, after entering the verification area, the user does not need to cooperate with the identity verification system to collect the real-time face image and wait for a long time, and only needs to display an identity card and a ticket and can quickly complete identity verification and enter the station. This is more convenient for the user. In addition, when many users line up to enter the station, the forward speed of the queue also greatly increases.

To make a person skilled in the art better understand the technical solutions in the present specification, the following clearly and comprehensively describes the technical solutions in the implementations of the present specification with reference to the accompanying drawings in one or more implementations of the present specification. Clearly, the described implementations are merely some rather than all of the implementations of the present specification. All other implementations obtained by a person of ordinary skill in the art based on the implementations of the present specification without creative efforts shall fall within the protection scope of the present specification.

The technical solutions provided in the implementations of the present specification are described in detail below with reference to the accompanying drawings.

Figure 2:
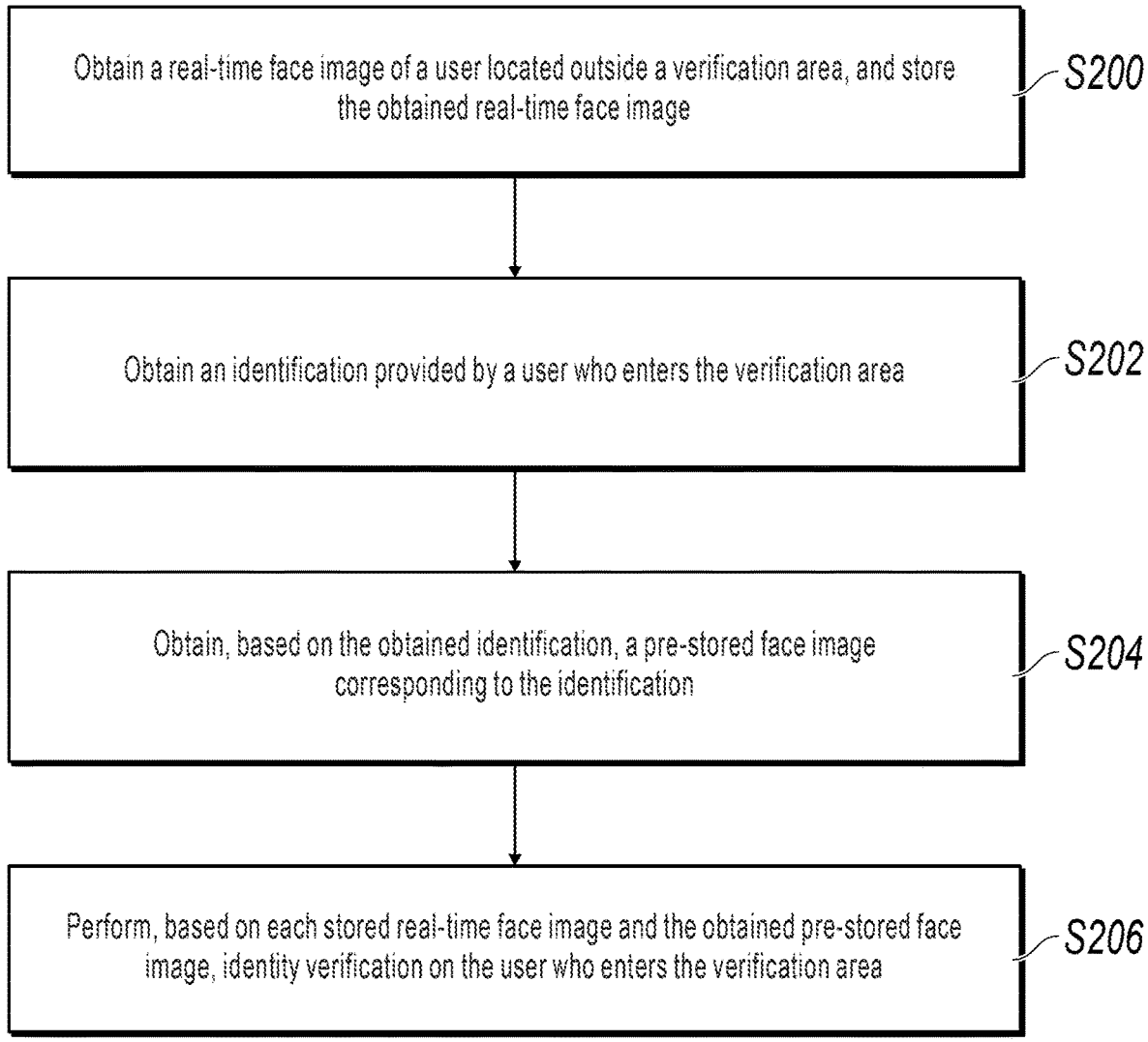
FIG. 2 is a flowchart illustrating an identity verification method, according to an implementation of the present specification.

FIG. 2 is a flowchart illustrating an identity verification method, according to an implementation of the present specification. The method includes the following steps.

S200. Obtain a real-time face image of a user located outside a verification area, and store the obtained real-time face image.

A scenario to which the implementation of the present specification is applied is that identity verification is performed on a user in a real-world service field, so as to determine whether the user is the actual owner of an identification displayed by the user. For example, in a mobile payment scenario, a verified user can use an account corresponding to an identification (specifically, an account identifier) displayed by the verified user to make payment.

For another example, in scenario of entering a station to take a train, after a user passes identity verification, the user can use a ticket held by the user to enter the station to take a train. More specifically, a scenario to which the present specification is applied can be a scenario in which multiple users line up to successively enter a verification area for verification, for example, the users line up to enter a station to take a train or make payment in a supermarket. For ease of description, the following mainly uses the scenario of entering a station to take a train as an example for description.

The method can be executed by an identity verification system including one or more apparatuses.

In the implementation of the present specification, the identity verification system performs identity verification only on a user who enters the verification area. For the identity verification system, the user who enters the verification area is a user who needs to accept identity verification. A user located outside the verification area can be a user waiting to enter the verification area to accept identity verification, or can be a user that does not intend to accept identity verification.

In the implementation of the present specification, the user located outside the verification area and waiting to enter the verification area can cooperate with the identity verification system to collect a real-time face image. Because users located outside the verification area are usually in a state of waiting to enter the verification area, collecting real-time face images of these users does not consume additional time of the users.

In addition, in the existing technology, for each user who enters the verification area, the user usually needs to cooperate with the identity verification system to perform real-time face image collection. As shown in FIG. 1, the user needs to face the camera to accept real-time face image collection. In implementations of the present specification, the method that the identity verification system obtains the real-time face image of the user located outside the verification area can be: obtaining a real-time image outside the verification area, and extracting a face image from the real-time image as the real-time face image of the user located outside the verification area.

The real-time image is usually obtained by the identity verification system by monitoring the outside of the verification area, that is, content displayed in the real-time image reflects a real-time state of the user located outside the verification area.

In the implementations of the present specification, the real-time state of the user is generally a relatively random state (the user sometimes is facing a camera, and the user sometimes is not facing the camera). Therefore, to ensure that the real-time image can record faces of users located outside the verification area, multiple cameras can be arranged to photograph the outside of the verification area at multiple directions. As such, even if the state of the user located outside the verification area is relatively random, the face image of the user can always be captured by a certain camera at a certain moment, the face of the user is recorded in the real-time image, and the identity verification system can extract the real-time face image of the user from the real-time image.

In implementations of the present specification, the real-time image is actually a video containing several consecutive frames of images. Each frame of image records an image at a certain moment outside the verification area. The identity verification system actually extracts a face image from each frame of image included in the real-time image as the real-time face image. Therefore, as long as the face image of the user located outside the verification area is captured by a camera at a certain moment, the identity verification system can extract the real-time face image of the user from the real-time image. As such, a user waiting for verification outside the verification area can accept face image collection without paying attention to the camera, and the identity verification system can still collect the real-time face image of the user located outside the verification area. This is also more convenient for the user.

Figure 3:
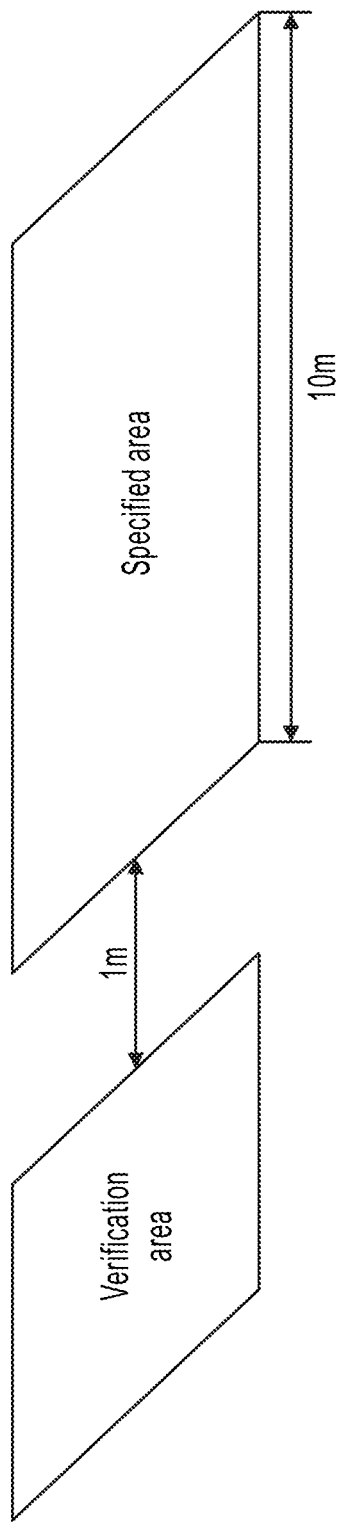
FIG. 3 is a schematic diagram illustrating a positional relationship between a verification area and a specified limited area in a scenario that a person enters a station to take a train, according to an implementation of the present specification.

Further, the identity verification system can monitor a specified area outside the verification area to obtain the real-time image. A size of the specified area and a positional relationship between the specified area and the verification area can be specified as needed. For example, as shown in FIG. 3, in a scenario of entering a station to take a train, the specified area can be a rectangular area that's (may be referred to as a waiting area) 1 m away from the verification area in a reverse direction of a moving direction of a check-in queue, a width of the waiting area is a width of the verification area, and a length of the waiting area is 10 m. A user in the check-in queue passes through the waiting area before entering the verification area.

S202. Obtain an identification provided by a user who enters the verification area.

In implementations of the present specification, the user who enters the verification area can provide the identification to the identity verification system in various ways. For example, the user can display a two-dimensional code to the identity verification system, and the identity verification system obtains, by scanning the two-dimensional code, the identification provided by the user, or the user can input the identification by using an input apparatus (such as an input panel, a touchscreen, or a keyboard) provided by the identity verification system.

In addition, the identity verification system reads the identification from a radio frequency identification (RFID) tag or a near field communication (NFC) chip carried by the user who enters the verification area. That is, the verification area can be a radio frequency identification sensing area or a near field communication sensing area. After entering the verification area, the user does not need to actively display the identification, and the identity verification system can read, by using a reader, the identification from the RFID tag or the NFC chip carried by the user. This can further accelerate identity verification.

S204. Obtain, based on the obtained identification, a pre-stored face image corresponding to the identification.

S206. Perform, based on each stored real-time face image and the obtained pre-stored face image, identity verification on the user who enters the verification area.

In the implementations of the present specification, the pre-stored face image corresponding to the identification is a pre-stored face image of the actual owner of the identification.

The identity verification system can determine whether a real-time face image that matches the obtained pre-stored face image exists in the each stored real-time face image; if yes, determines that the user succeeds in identity verification; otherwise, determines that the user fails in identity verification.

According to the identity verification method shown in FIG. 2, before the user enters the verification area, the identity verification system can obtain and store the real-time face image of the user. After the user enters the verification area, the identity verification system only needs to obtain the identification provided by the user, and can obtain, based on the obtained identification, the pre-stored face image corresponding to the identification; and further verify the identity of the user based on the stored real-time face image and the obtained pre-stored face image. As such, after the user enters the verification area, the identity verification system can quickly complete identity verification on the user by only obtaining the identification provided by the user, and no need to consume time to collect the real-time face image of the user. That is, after the user enters the verification area, identity verification on the user can be completed in a short time.

Figure 4:
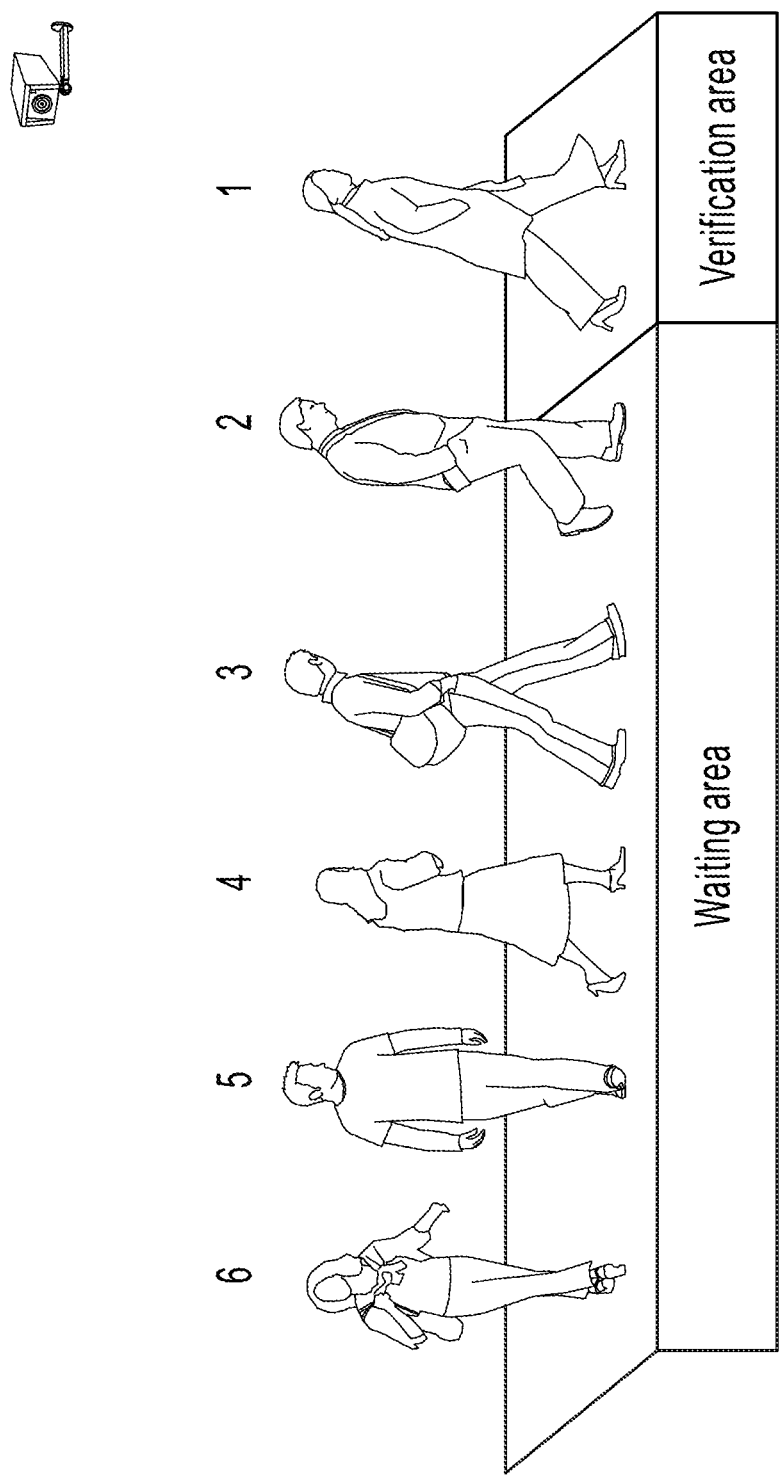
FIG. 4 is a schematic diagram in which users line up to enter a verification area in a scenario that persons enter a station to take a train, according to an implementation of the present specification.

In addition, FIG. 4 is a schematic diagram in which users line up to enter a verification area in a scenario of entering a station to take a train. As shown in FIG. 4, the closer the user in the queue is to the camera, the larger the size of the face image of the user that is collected by the identity verification system, and the farther the user in the queue is to the camera, the smaller the size of the face image of the user that is collected by the identity verification system. For example, in a frame of image included in a real-time image, a size of a face image of user 1 is greater than a size of a face image of user 2, the size of the face image of user 2 is greater than a size of a face image of user 3, etc. It can be seen that, for a user whose real-time face image is too small, it will take a relatively long time for the user to enter the verification area. To avoid a large quantity of real-time face images that need to be subsequently compared by an identity verification device, and improve subsequent verification efficiency, a face image whose size is too small may not be extracted from the real-time image. For a user with a large real-time face image, the user may have entered or is about to enter the verification area, and the identity verification system probably might have stored the real-time face image of the user previously. Therefore, in consideration of improving subsequent verification efficiency, the face image with a large size may not be extracted from the real-time image.

Based on the previous description, the identity verification system can extract a face image whose size falls within a specified size range from the real-time image as the real-time face image. The specified size range can be determined based on a size of the specified limited area, the positional relationship between the specified limited area and the verification area, photographing parameters of the camera, etc. As such, the quantity of stored real-time face images can be relatively small because real-time face images of a large size or a small size are not extracted, and subsequently, identity verification efficiency can be effectively improved.

It should be further noted that, in the scenario of entering a station to take a train, because each user in the queue needs to spend some time to enter the verification area from the outside of the verification area, the real-time image that is outside the verification area and that is obtained by the identity verification system also records an entire process of the user entering the verification area from the outside of the verification area. As shown in FIG. 4, the real-time image records the entire process of passing through the specified limited area by each user in the queue. This may lead to a large quantity of repeated face images extracted by the identity verification system from each frame of image in the real-time image. To avoid this case, a method in which the identity verification system extracts the face image from the real-time image can be: extracting several frames of images from the real-time image based on a predetermined extraction rule, and for each frame of image extracted, extracting a face image from the frame of image. The extraction rule can be extracting a currently displayed image from the real-time image whenever a specified period (such as 200 ms) elapses.

Further, the identity verification system can delete, from the stored real-time face images, a real-time face image previously obtained before a specified time period, that is, the real-time face image stored in the identity verification system is always a real-time face image obtained in a latest specified time period. In the scenario of entering a station to take a train, the identity verification system does not need to store a real-time face image of a user who identity has been verified. The specified time period can be specified as needed, so the real-time face image obtained before the specified time period and deleted by the identity verification system is, as far as possible, a real-time face image of a user whose identity is verified, and the real-time face image obtained in the latest specified time period and stored by the identity verification system is, as far as possible, a real-time face image of a user whose identity is not verified. As such, the quantity of real-time face images that need to be compared in step S206 can be reduced, and a verification speed of the identity verification system can be improved.

Figure 5:
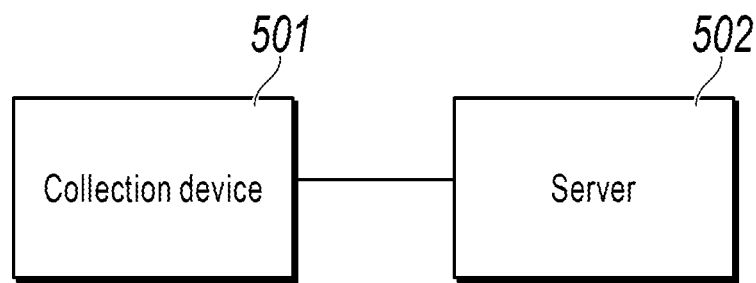
FIG. 5 is a schematic diagram illustrating an identity verification system, according to an implementation of the present specification.

FIG. 5 is a schematic diagram illustrating an identity verification system, according to an implementation of the present specification, including a collection device 501 and a server 502.

The collection device 501 obtains a real-time face image or a real-time image, and sends the obtained real-time face image or real-time image to the server, where the real-time face image is a real-time face image of a user located outside a verification area, and the real-time image is a real-time image outside the verification area; and obtains an identification provided by a user who enters the verification area, and sends the obtained identification to the server; and the server 502 receives and stores the real-time face image sent by the collection device, or receives the real-time image sent by the collection device, and extracts a face image from the real-time image as a real-time face image for storage; and receives the identification sent by the collection device, obtains, based on the identification, a pre-stored face image corresponding to the identification, and performs, based on each stored real-time face image and the obtained pre-stored face image, identity verification on the user who enters the verification area.

That is, the identity verification procedure shown in FIG. 2 can be executed by the collection device and the server. The collection device is usually placed in the real-world, and can obtain, on site, the real-time face image of the user located outside the verification area, and obtain the identification provided by the user entering the verification area.

Figure 6:
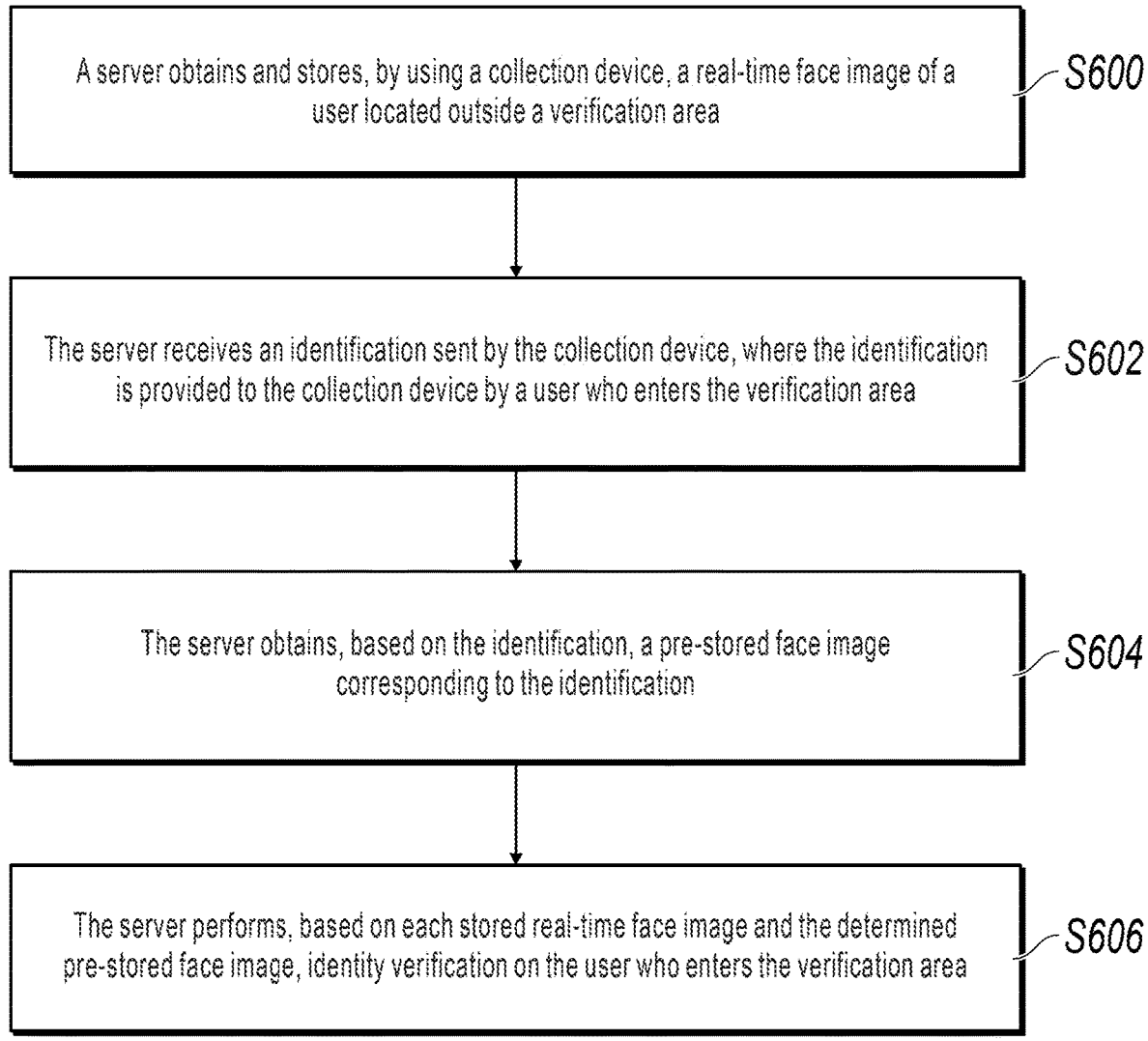
FIG. 6 is a flowchart illustrating another identity verification method, according to an implementation of the present specification.

FIG. 6 is a flowchart illustrating another identity verification method, according to an implementation of the present specification. The method includes the following steps.

S600. A server obtains and stores, by using a collection device, a real-time face image of a user located outside a verification area.

S602. The server receives an identification sent by the collection device, where the identification is provided to the collection device by a user who enters the verification area.

S604. The server obtains, based on the identification, a pre-stored face image corresponding to the identification.

S606. The server performs, based on each stored real-time face image and the determined pre-stored face image, identity verification on the user who enters the verification area.

The method shown in FIG. 6 is executed by the server. Specifically, in step S600, the server can receive the real-time face image that is sent by the collection device and that corresponds to the user located outside the verification area; or receive a real-time image that is sent by the collection device and that is outside the verification area, and extract a face image from the real-time image as the real-time face image of the user located outside the verification area.

Figure 7:
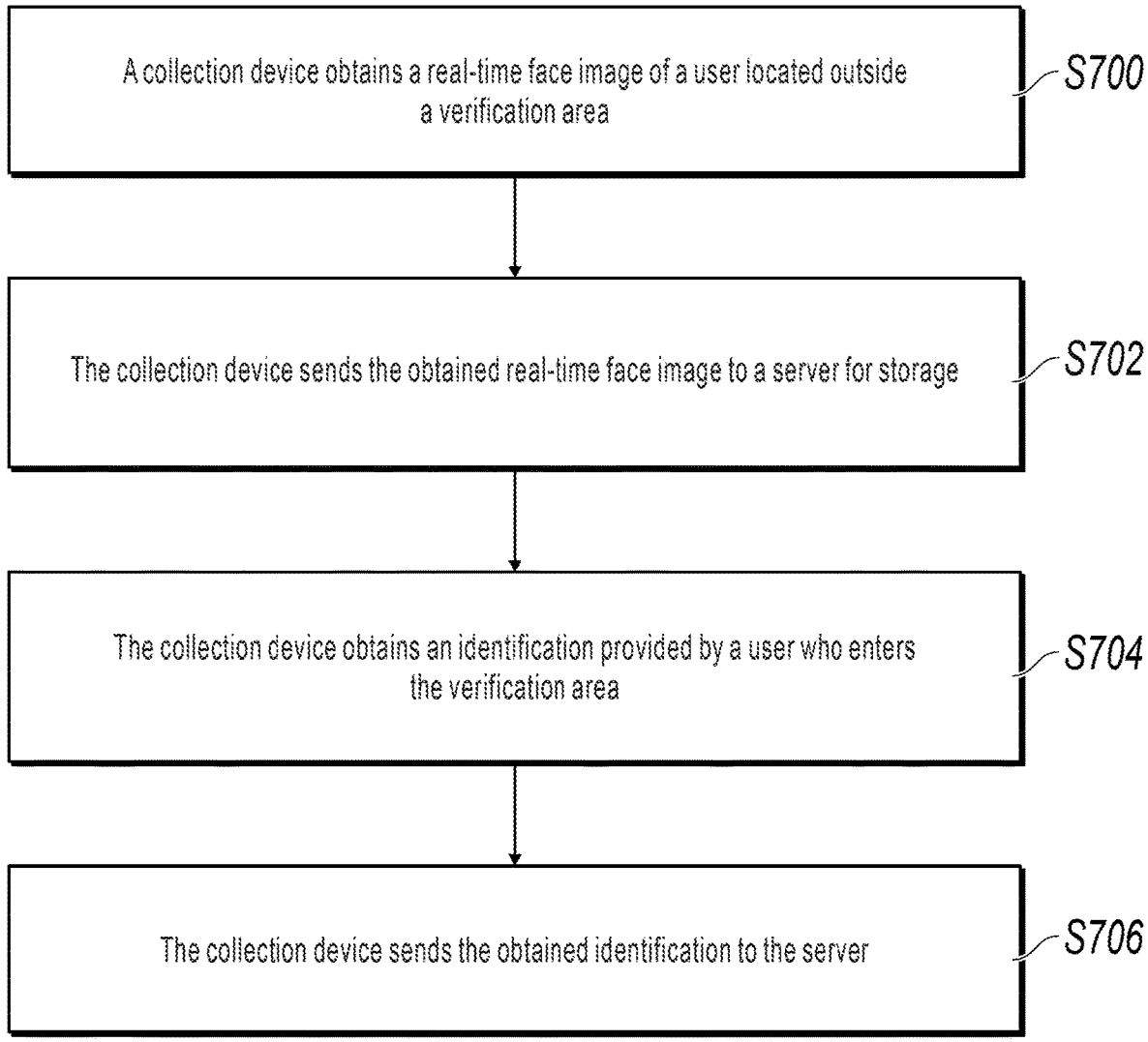
FIG. 7 is a flowchart illustrating another identity verification method, according to an implementation of the present specification.

FIG. 7 is a flowchart illustrating another identity verification method, according to an implementation of the present specification. The method includes the following steps.

S700. A collection device obtains a real-time face image of a user located outside a verification area.

S702. The collection device sends the obtained real-time face image to a server for storage.

S704. The collection device obtains an identification provided by a user who enters the verification area.

S706. The collection device sends the obtained identification to the server.

The method shown in FIG. 7 is executed by the collection device. In step S706, the collection device sends the obtained identification to the server, so the server obtains, based on the received identification, a pre-stored face image corresponding to the identification, and further performs, based on each stored real-time face image and the obtained pre-stored face image, identity verification on the user who enters the verification area.

Further, in step S700, the collection device can collect a real-time image outside the verification area, and extract a face image from the real-time image as the real-time face image of the user located outside the verification area.

Figure 8:
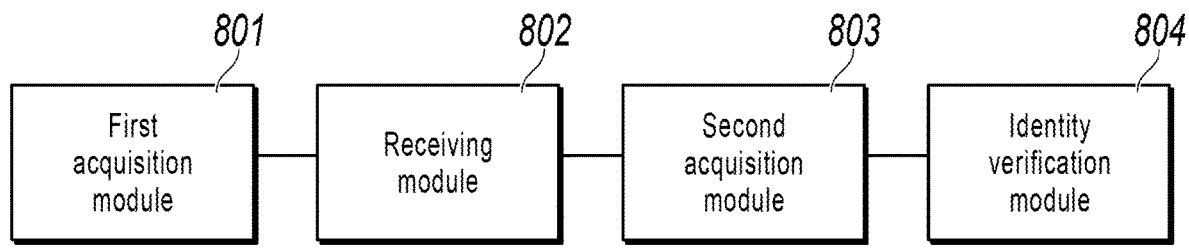
FIG. 8 is a schematic diagram illustrating an identity verification apparatus, according to an implementation of the present specification.

Based on the identity verification method shown in FIG. 6, an implementation of the present specification correspondingly provides an identity verification apparatus. As shown in FIG. 8, the apparatus includes: a first acquisition module 801, configured to obtain and store, by using a collection device, a real-time face image of a user located outside a verification area; a receiving module 802, configured to receive an identification sent by the collection device, where the identification is provided to the collection device by a user who enters the verification area; a second acquisition module 803, configured to obtain, based on the identification, a pre-stored face image corresponding to the identification; and an identity verification module 804, configured to perform, based on each stored real-time face image and the determined pre-stored face image, identity verification on the user who enters the verification area.

The first acquisition module 801 receives the real-time face image that is sent by the collection device and that corresponds to the user located outside the verification area; or receives a real-time image that is sent by the collection device and that is outside the verification area, and extracts a face image from the real-time image as the real-time face image of the user located outside the verification area.

Figure 9:
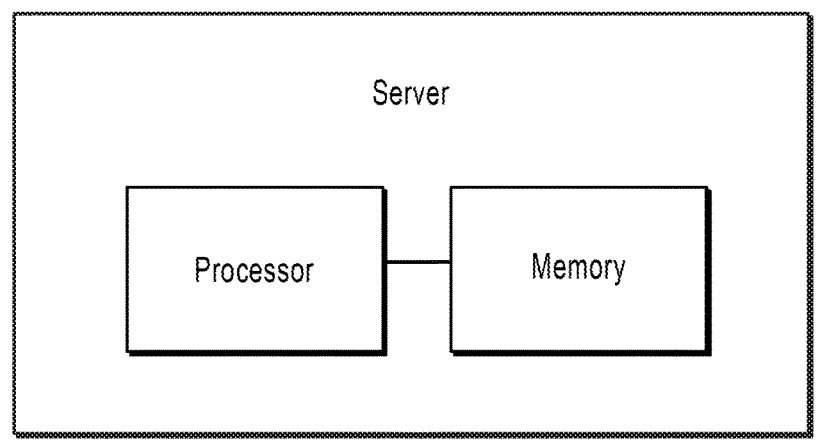
FIG. 9 is a schematic diagram illustrating a server, according to an implementation of the present specification.

Based on the identity verification method shown in FIG. 6, an implementation of the present specification further correspondingly provides a server. As shown in FIG. 9, the server includes one or more processors and one or more memories, the memory stores a program, and the program is executed by the one or more processors to perform the following steps: obtaining and storing, by using a collection device, a real-time face image of a user located outside a verification area; receiving an identification sent by the collection device, where the identification is provided to the collection device by a user who enters the verification area; obtaining, based on the identification, a pre-stored face image corresponding to the identification; and performing, based on each stored real-time face image and the determined pre-stored face image, identity verification on the user who enters the verification area.

Figure 10:
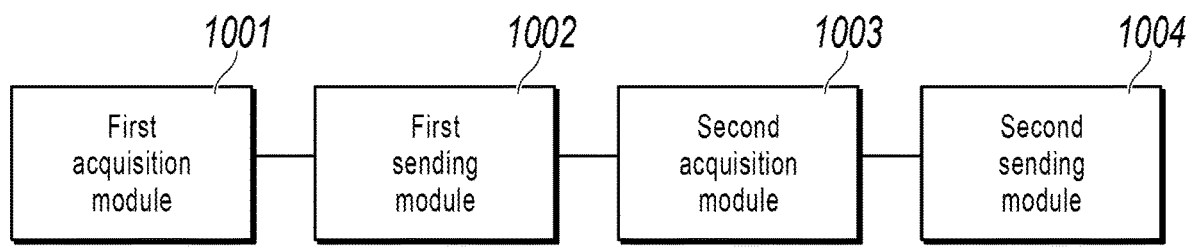
FIG. 10 is a schematic diagram illustrating another identity verification apparatus, according to an implementation of the present specification.

Based on the identity verification method shown in FIG. 7, an implementation of the present specification further correspondingly provides an identity verification apparatus. As shown in FIG. 10, the apparatus includes: a first acquisition module 1001, configured to obtain a real-time face image of a user located outside a verification area; a first sending module 1002, configured to send the obtained real-time face image to a server for storage; a second acquisition module 1003, configured to obtain an identification provided by a user who enters the verification area; and a second sending module 1004, configured to send the obtained identification to the server, so the server obtains, based on the received identification, a pre-stored face image corresponding to the identification, and further performs, based on each stored real-time face image and the obtained pre-stored face image, identity verification on the user who enters the verification area.

The first acquisition module 1001 obtains a real-time image outside the verification area; and extracts a face image from the real-time image as the real-time face image of the user located outside the verification area.

Figure 11:
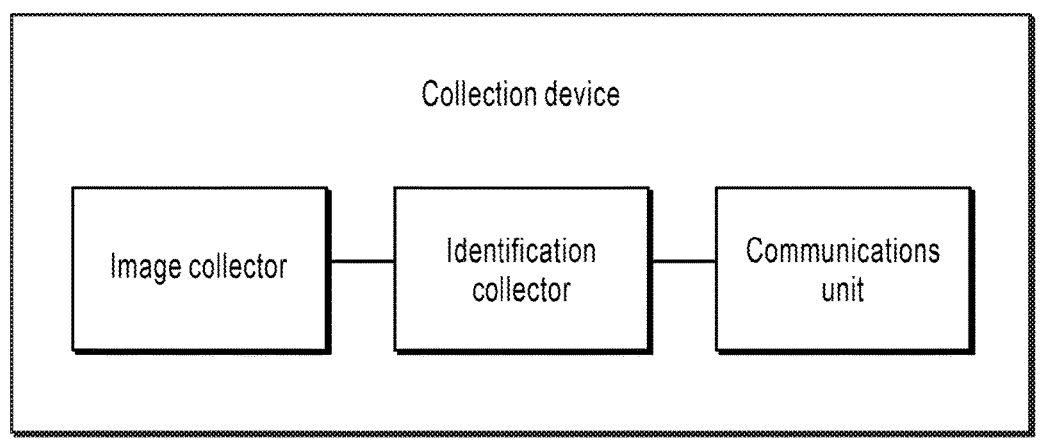
FIG. 11 is a schematic diagram illustrating a collection device, according to an implementation of the present specification.

Based on the identity verification method shown in FIG. 7, an implementation of the present specification further correspondingly provides a collection device. As shown in FIG. 11, the collection device includes an image collector, an identification collector, and a communications unit.

The image collector obtains a real-time face image of a user located outside a verification area; the identification collector obtains an identification provided by a user who enters the verification area; and the communications unit sends the obtained real-time face image and the obtained identification to a server, so the server stores the received real-time face image, obtains, based on the received identification, a pre-stored face image corresponding to the identification, and further performs, based on each stored real-time face image and the obtained pre-stored face image, identity verification on the user who enters the verification area.

Figure 12:
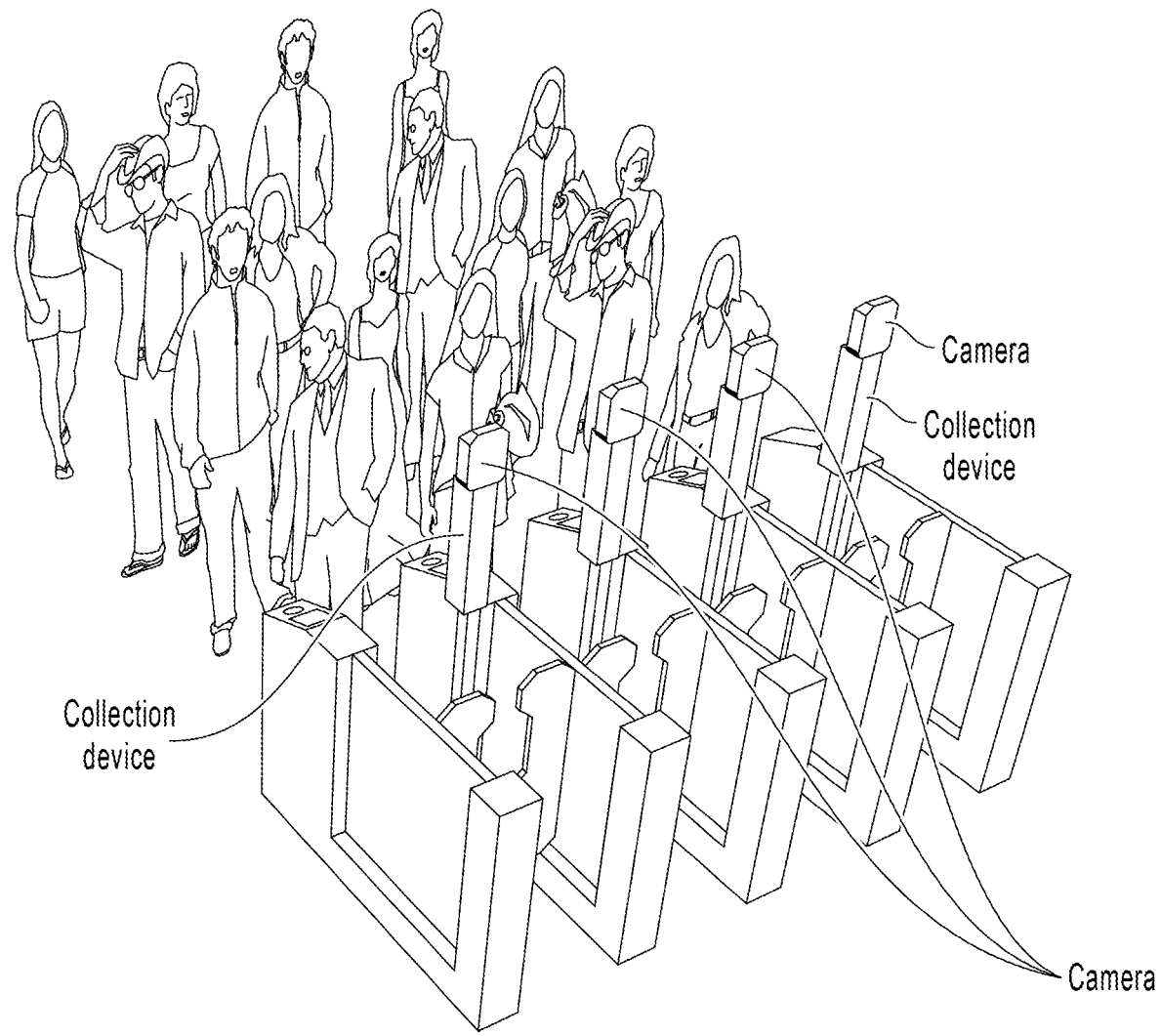
FIG. 12 is a schematic diagram illustrating arrangement of collection devices, according to an implementation of the present specification.

The image collector includes at least two cameras; and the cameras are installed at different positions, and are configured to photograph the outside of the verification area at different directions, which can be specifically shown in FIG. 12. As shown in FIG. 12, for each metro gate, two collection devices can be disposed at the metro gate, a camera is installed on each collection device, and a height, a photographing direction, and an angle of the camera can be adjusted as needed.

The implementations in the present specification are described in a progressive way. For same or similar parts of the implementations, references can be made to the implementations. Each implementation focuses on a difference from other implementations. Especially, the server shown in FIG. 10 is basically similar to the method implementation, and therefore is described briefly; for related parts, reference can be made to some descriptions in the method implementation.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit. A controller can be implemented in any appropriate method. For example, the controller can be a microprocessor, a processor, or a computer readable medium, a logic gate, a switch, an application-specific integrated circuit (ASIC), a programmable logic controller, or an embedded microcontroller that stores computer readable program code (for example, software or firmware) that can be executed by the processor (or the microprocessor). Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that an implementation of the present specification can be provided as a method, a system, or a computer program product. Therefore, the present specification can use a form of hardware only implementations, software only implementations, or implementations with a combination of software and hardware. Moreover, the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a computer readable storage medium.

A computer readable storage medium includes persistent, non-persistent, removable, and unmovable media that can store information by using any method or technology. The information can be a computer readable instruction, a data structure, a program module, or other data. Examples of the computer readable storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable storage medium does not include computer readable transitory media such as a modulated data signal and a carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

What is claimed is:

1. An identity verification method, comprising:
   while a user is located in a waiting area that is adjacent to and not overlapping with a verification area, obtaining, using one or more computing devices and in real time, a video of the waiting area that does not include the verification area;
   extracting, using the one or more computing devices, a plurality of images from the video, wherein the plurality of images comprises a first image of the user, wherein the plurality of images further comprises a first and second face image of the user, and wherein extracting the plurality of images comprises:
      extracting a plurality of frames from the video;
      identifying, from the plurality of frames, the first and second face image of the user;
      determining that a size of the second face image is greater than a predetermined size and the size of the first face image is smaller than the predetermined size; and
      in response to determining that the size of the second face image is greater than the predetermined size and the size of the first face image is smaller than the predetermined size, extracting, from the plurality of frames, the first face image of the user;
   storing, using the one or more computing devices, the plurality of images;
   while the user is located inside the verification area, obtaining, using the one or more computing devices, identification information from the user;
   identifying, using the one or more computing devices and based on the identification information, a second image that is associated with the identification information; and
   performing, using the one or more computing devices, identity verification on the user using the plurality of images, including the first image, and the second image.

2. The method according to claim 1, wherein the verification area is a predefined area where the identity verification is performed, wherein the waiting area is a predefined area.

3. The method according to claim 1, further comprising:
deleting, from the plurality of images, an image obtained at a time that is before a predetermined time period.

4. The method according to claim 1, wherein obtaining the identification information from the user comprises:
obtaining the identification information from a radio frequency identification (RFID) tag or a near field communication (NFC) chip carried by the user.

5. The method according to claim 1, wherein the performing comprises:
determining whether any image of the plurality of images matches the second image;
in response to determining that a particular image of the plurality of images matches the second image, determining that the user passed the identity verification; and
in response to determining that none of the plurality of images matches the second image, determining that the user failed the identity verification.

6. A non-transitory, computer-readable medium storing one or more instructions executable by a computer system to perform operations comprising:
while a user is located in a waiting area that is adjacent to and not overlapping with a verification area, obtaining, using one or more computing devices and in real time, a video of the waiting area that does not include the verification area;
extracting, using the one or more computing devices, a plurality of images from the video, wherein the plurality of images comprises a first image of the user, wherein the plurality of images further comprises a first and second face image of the user, and wherein extracting the plurality of images comprises:
extracting a plurality of frames from the video;
identifying, from the plurality of frames, the first and second face image of the user;
determining that a size of the second face image is greater than a predetermined size and the size of the first face image is smaller than the predetermined size; and
in response to determining that the size of the second face image is greater than the predetermined size and the size of the first face image is smaller than the predetermined size;
extracting, from the plurality of frames, the first face image of the user;
storing, using the one or more computing devices, the plurality of images;
while the user is located inside the verification area, obtaining, using the one or more computing devices, identification information from the user;
identifying, using the one or more computing devices and based on the identification information, a second image that is associated with the identification information; and
performing, using the one or more computing devices, identity verification on the user using the plurality of images, including the first image, and the second image.

7. The non-transitory, computer-readable medium according to claim 6, wherein the verification area is a predefined area where the identity verification is performed, wherein the waiting area is a predefined area.

8. The non-transitory, computer-readable medium according to claim 6, wherein the operations further comprise:
deleting, from the plurality of images, an image obtained at a time that is before a predetermined time period.

9. The non-transitory, computer-readable medium according to claim 6, wherein obtaining the identification information from the user comprises:
obtaining the identification information from a radio frequency identification (RFID) tag or a near field communication (NFC) chip carried by the user.

10. The non-transitory, computer-readable medium according to claim 6, wherein the performing comprises:
determining whether any image of the plurality of images matches the second image;
in response to determining that a particular image of the plurality of images matches the second image, determining that the user passed the identity verification; and
in response to determining that none of the plurality of images matches the second image, determining that the user failed the identity verification.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
while a user is located in a waiting area that is adjacent to and not overlapping with a verification area, obtaining, using one or more computing devices and in real time, a video of the waiting area that does not include the verification area;
extracting, using the one or more computing devices, a plurality of images from the video, wherein the plurality of images comprises a first image of the user, wherein the plurality of images further comprises a first and second face image of the user, and wherein extracting the plurality of images comprises:
extracting a plurality of frames from the video;
identifying, from the plurality of frames, the first and second face image of the user;
determining that a size of the second face image is greater than a predetermined size and the size of the first face image is smaller than the predetermined size; and
in response to determining that the size of the second face image is greater than the predetermined size and the size of the first face image is smaller than the predetermined size,
extracting, from the plurality of frames, the first face image of the user;
storing, using the one or more computing devices, the plurality of images;
while the user is located inside the verification area, obtaining, using the one or more computing devices, identification information from the user;
identifying, using the one or more computing devices and based on the identification information, a second image that is associated with the identification information; and
performing, using the one or more computing devices, identity verification on the user using the plurality of images, including the first image, and the second image.

12. The computer-implemented system according to claim 11, wherein the verification area is a predefined area where the identity verification is performed, wherein the waiting area is a predefined area.

13. The computer-implemented system according to claim 11, wherein the operations further comprise:
   deleting, from the plurality of images, an image obtained at a time that is before a predetermined time period.

14. The computer-implemented system according to claim 11, wherein obtaining the identification information from the user comprises:
   obtaining the identification information from a radio frequency identification (RFID) tag or a near field communication (NFC) chip carried by the user.

15. The method according to claim 1, wherein the waiting area is a rectangular area, and wherein a gap exists between the waiting area and the verification area.

16. The method according to claim 15, wherein the verification area is a rectangular area, and wherein a width of the waiting area is the same as a width of the verification area.

\* \* \* \* \*